US006829768B1

(12) United States Patent
Suzuki et al.

(10) Patent No.: US 6,829,768 B1
(45) Date of Patent: Dec. 7, 2004

(54) INFORMATION PROCESSING METHOD AND INFORMATION PROCESSING APPARATUS

(75) Inventors: Yumi Suzuki, Kawasaki (JP); Chizu Yoshioka, Kawasaki (JP); Fumiyasu Ige, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/162,849

(22) Filed: Sep. 29, 1998

(30) Foreign Application Priority Data

May 12, 1998 (JP) .......................................... 10-128835

(51) Int. Cl.[7] .................................................. G06F 9/46

(52) U.S. Cl. ........................ 719/312; 379/286; 379/339

(58) Field of Search ............................ 709/1, 100–108, 709/310–332; 379/219–241, 9–13; 717/7

(56) References Cited

U.S. PATENT DOCUMENTS 4,551,832 A * 11/1985 Carll et al. .................... 370/58
5,414,762 A * 5/1995 Flisik et al. ................ 379/198
5,488,569 A * 1/1996 Kaplan et al. .............. 709/228
6,009,093 A * 12/1999 Choe .......................... 370/376

FOREIGN PATENT DOCUMENTS

DE 4333004 A1 * 3/1995 .......... H04Q/3/545

* cited by examiner

*Primary Examiner*—Meng-Al T. An
*Assistant Examiner*—Charles Anya
(74) *Attorney, Agent, or Firm*—Katten Muchin Zavis Rosenman

(57) ABSTRACT

An information processing apparatus has an SDL execution unit described in a specification and description language (SDL), an external environment description unit described in a programming language other than the SDL, and an adapter having a pseudo internal signal generator and a queue manager. A task of an operation system is assigned to the external environment description unit, which is combined with the SDL execution unit through the adapter. The pseudo internal signal generator converts signals including messages, events, and parameters to be transferred between the SDL execution unit and the external environment description unit. The converted signals are transferred between the SDL execution unit and the external environment description unit through the queue manager. Also provided is an information processing method to materialize the information processing apparatus. These method and apparatus reduce the overhead of the operation system.

2 Claims, 10 Drawing Sheets

INFORMATION PROCESSING METHOD AND INFORMATION PROCESSING APPARATUS

BACKGROUND OF THE INVENTION

1. Field of the Invention

The present invention relates to an information processing method and an information processing apparatus, having an SDL (specification and description language) execution unit described in SDL, an external environment description unit described in a programming language other than SDL, and an OS (operating system).

The SDL is based on CEFSM (communicating extended finite-state machine) of ITU-T Recommendations and is used to describe the specifications of information processing equipment such as exchanges. There are many programs described in other programming languages such as C and C++. There is a necessity of properly integrating programs described in SDL with programs described in other languages.

2. Description of the Related Art

SDL execution units contained in an SDL block are executed as tasks of an OS (operating system). If the number of the SDL execution units is large, the overhead of the OS increases because the OS must create tasks for the SDL execution units. An increase in the overhead of the OS causes a problem in a system such as a telephone exchange system that must secure real-time processing.

Communication between the SDL execution units and an external environment description unit and communication among the SDL execution units are controlled by communication controllers of the OS. If the numbers of signals handled by the communication controllers increase, the overhead of the OS also increases.

The external environment description unit must define signals such that the signals are easy to handle for the SDL execution units. The external environment description unit, therefore, is unable to form its own data group.

SUMMARY OF THE INVENTION

An object of the present invention is to integrate an external environment description unit with an SDL execution unit and assign a task of an OS to the integrated unit, to reduce the overhead of the OS.

In order to accomplish the object, a first aspect of the present invention provides an information processing method for use with an SDL execution unit described in SDL, an external environment description unit described in a programming language other than SDL, and an adapter. The adapter has a pseudo internal signal generator and a queue manager. The method includes the steps of connecting the external environment description unit and the SDL execution unit to each other through the adapter so that signals containing messages, events, and parameters may be exchanged between them through the adapter; assigning a task of an OS to the external environment description unit; and executing the task so that the pseudo internal signal generator may convert and transfer the signals between the external environment description unit and the SDL execution unit.

A second aspect of the present invention provides an information processing method for use with an SDL execution unit described in SDL, an external environment description unit described in a programming language other than SDL, and an adapter. The adapter has a pseudo internal signal generator and a queue manager. The method includes the steps of connecting the external environment description unit and the SDL execution unit to each other through the adapter so that signals containing messages, events, and parameters may be exchanged between them through the adapter; receiving information to be transferred to the SDL execution unit from the external environment description unit, the information being received as function parameters for the pseudo internal signal generator; converting the information by the pseudo internal signal generator into signals to be supplied to the SDL execution unit; transferring the converted signals to the queue manager; monitoring an internal queue of the queue manager; and activating, if the internal queue is holding the converted signals, the SDL execution unit by function call so that the activated SDL execution unit may fetch the converted signals from the internal queue and carry out processes accordingly.

A third aspect of the present invention provides an information processing apparatus for processing information under the control of a task assigned by an operation system. The apparatus has an adapter for connecting an SDL execution unit described in SDL and an external environment description unit described in a programming language other than SDL to each other so that signals may be transferred between them through the adapter under a task of the operation system assigned to the external environment description unit. The adapter has a pseudo internal signal generator and a queue manager. The pseudo internal signal generator separates, integrates, and converts signals to be transferred between the SDL execution unit and the external environment description unit. The queue manager has an internal queue for holding the signals to be transferred between the SDL execution unit and the external environment description unit.

BRIEF DESCRIPTION OF THE DRAWINGS

The above object and features as well as other features of the present invention will be more apparent from the following description of the preferred embodiments with reference to the drawings, wherein.

DESCRIPTION OF THE PREFERRED EMBODIMENTS

Figure 10:
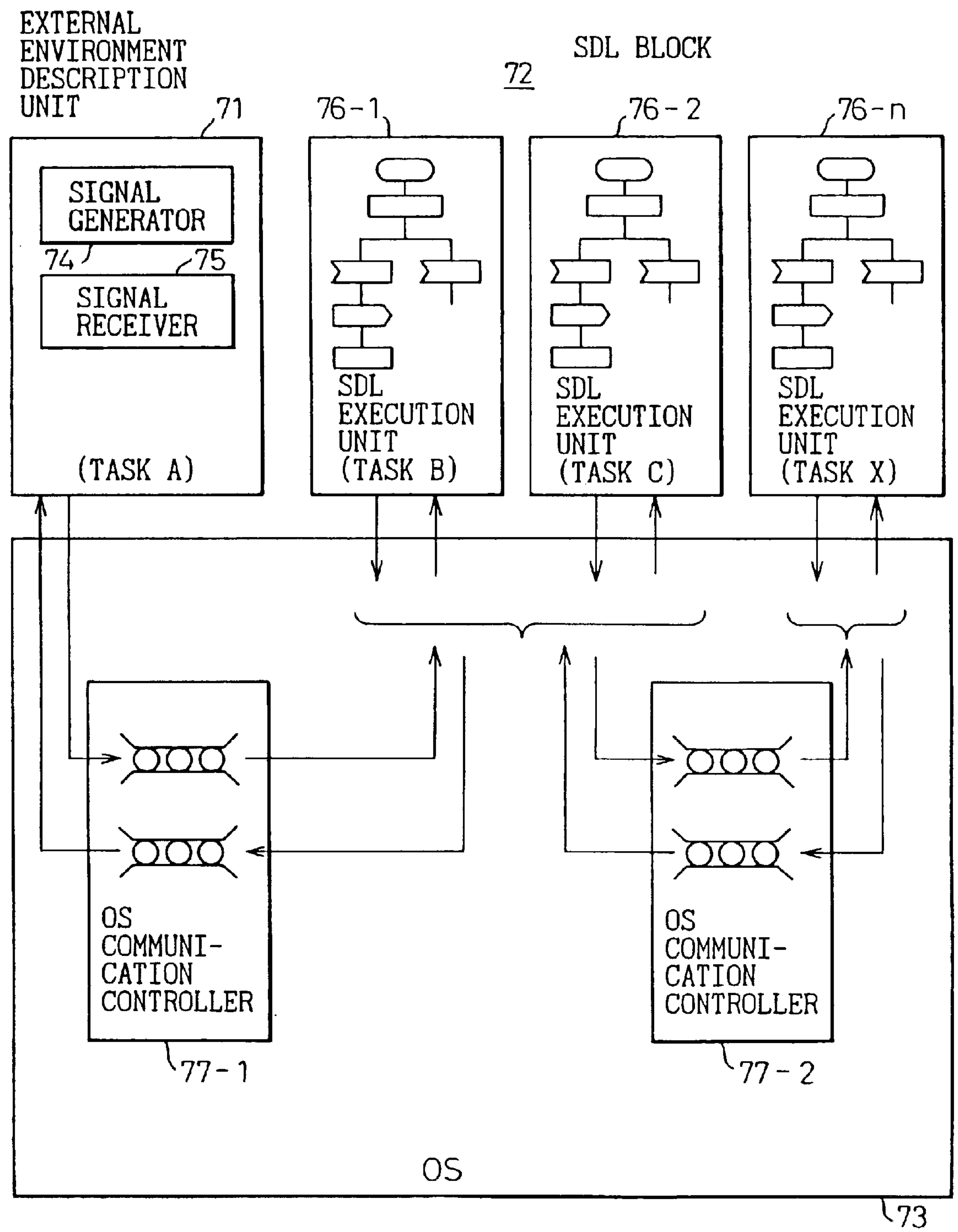
FIG. 10 shows a prior art.

For better understanding of the present invention, an information processing method according to a prior art will first be described with reference to FIG. 10.

The prior art has an external environment description unit 71 (hereinafter referred to as the environment unit 71), an SDL block 72, an operation system (OS) 73, a signal generator 74, a signal receiver 75, SDL execution units 76-1 to 76-*n*, and OS communication controllers 77-1 and 77-2.

The prior art is applicable to information processing equipment such as an exchange. In this case, the OS 73 serves as a central controller for controlling respective parts, and the environment unit 71 transmits and receives control information to and from subscribers and processes the control information. The environment unit 71 is described in a programming language such as C or C++.

The SDL block 72 contains the SDL execution units 76-1 to 76-*n* each of which represents a service described in SDL (specification and description language). The services provided by the SDL execution units are, for example, central control, speech channel switching, and accounting functions. The SDL includes SDL/GR (SDL graphical representation) and SDL/PR (SDL phrase representation). The environment unit 71 serves as an external environment for the SDL execution units 76-1 to 76-*n* and is described in a programming language other than SDL.

Basic operations carried out between the environment unit 71 and the SDL block 72 (SDL execution units 76-1 to 76-*n*) are activation and information exchange both based on signals. Accordingly, the OS 73 assigns tasks A to X to the environment unit 71 and SDL execution units 76-1 to 76-*n*, respectively. Signal transfer between, for units 76-1 and 76-2 is carried out through a queue in the communication controller 77-1 under the control of the OS 73. Similarly, signal transfer between the SDL execution units, for example, 76-1 and 76-2 is carried out through a queue in the communication controller 77-2 under the control of the OS 73.

In this way, the SDL block 72 is described in SDL for providing various services, and the environment unit 71 has existing parameters, etc., and serves as an external environment for the SDL block 72. Since the environment unit 71 is described in a programming language other than SDL, it is impossible to directly transfer signals between the SDL block 72 and the environment unit 71.

Accordingly, the communication controllers 77-1 and 77-2 controlled by the OS 73 must mediate between the SDL block 72 and the environment unit 71. At this time, the OS 73 must assign tasks A to X to the environment unit 71 and SDL execution units 76-1 to 76-*n*, respectively.

If the number of the SDL execution units is large, the number of the tasks assigned to them increases accordingly, to increase the overhead of the OS 73. This causes a problem in a system such as a telephone exchange system that must secure real-time processing.

Signal transfer between the environment unit 71 and the SDL execution units 76-1 to 76-*n*, or between the SDL execution units is carried out through the communication controllers 77-1 and 77-2 controlled by the OS 73. If the number of signals to be transferred increases, the overhead of the OS 73 increases as in the case of assigning tasks.

In addition, the environment unit 71 must define signals such that the signals may easily be handled by the SDL execution units, and therefore, it is not easy for the environment unit 71 to form its own data group.

Next, preferred embodiments of the present invention will be explained.

Figure 1:
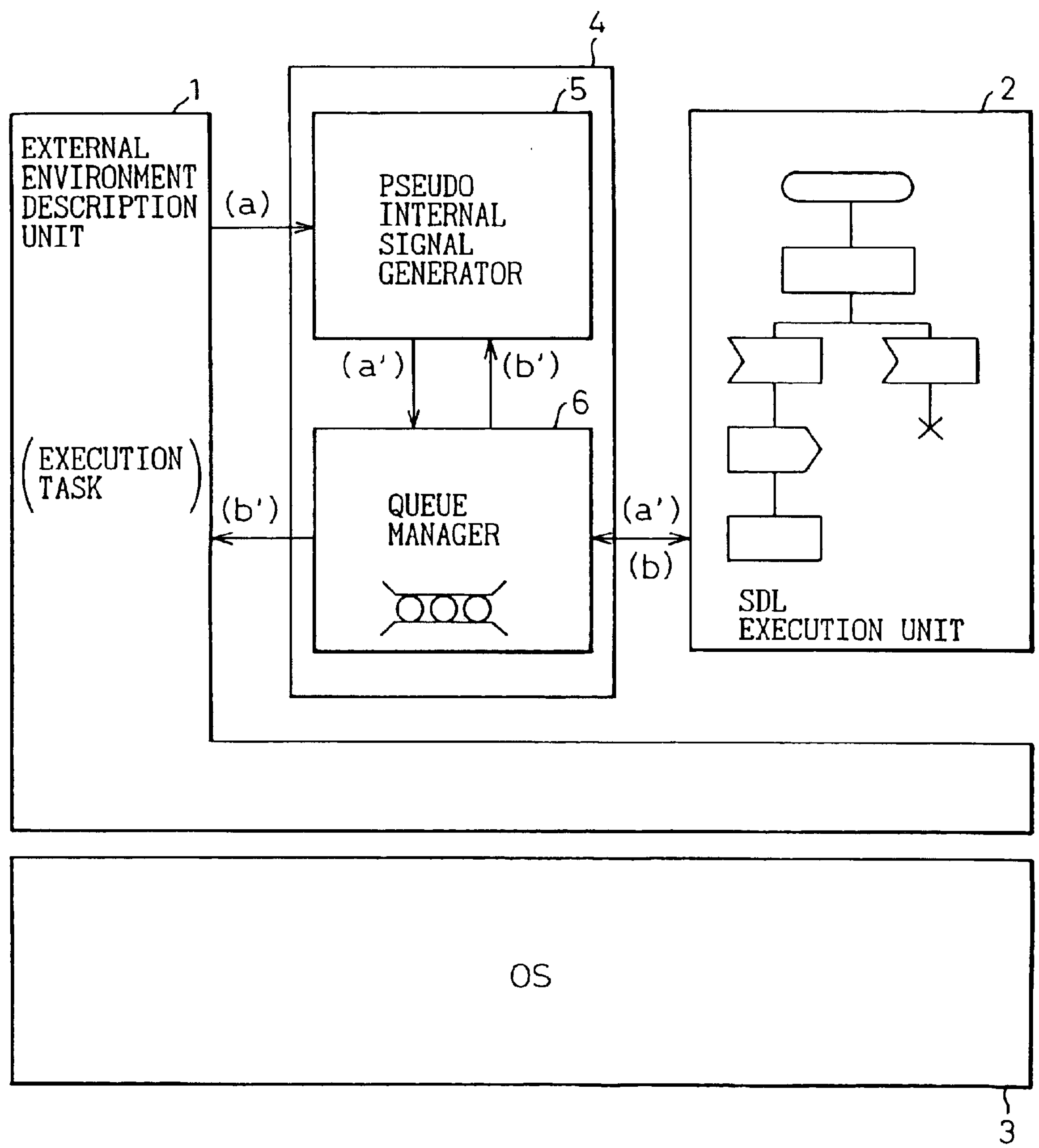
FIG. 1 shows essential part of an embodiment of the present invention.

FIG. 1 shows essential part of an embodiment of the present invention. The embodiment has an external environment description unit 1 (hereinafter referred to as the environment unit 1), an SDL execution unit 2, an, operation system (OS) 3, and an adapter 4. The adapter 4 includes a pseudo internal signal generator 5 and a queue manager 6.

The environment unit 1 is described in a programming language, such as C or C++, other than SDL. The environment unit 1 is executed as an execution task assigned by the OS 3. This execution task covers the SDL execution unit 2 as well. The environment unit 1 and SDL execution unit 2 are combined together by, for example, a function call. To realize this, the adapter 4 has the pseudo internal signal generator 5 and queue manager 6. Although the SDL execution unit 2 shown in FIG. 1 is, single, actual practice involves a plurality of SDL execution units that are connected to internal queues of the queue manager 6.

The pseudo internal signal generator 5 converts a signal (a) that may contain messages, events, parameters, etc., received from the environment unit 1 into a signal (a') suitable for SDL. The signal (a') is set in an internal queue of the queue manager 6. The queue manager 6 monitors whether or not a signal is present in the internal queue, and if a signal is present, activates the SDL execution unit 2 by a function call. The activated SDL execution unit 2 fetches the signal (a') from the internal queue of the queue manager 6. A signal (b) from the SDL execution unit 2 is transferred to the pseudo internal signal generator 5 through the queue manager 6 and is converted into a signal (b') for the environment unit 1. The signal (b') is transferred to the environment unit 1.

In this way, information to be transferred to the SDL execution unit 2 from the environment unit 1 is transmitted as a function parameter for the pseudo internal signal generator 5. Then, the information is converted into a signal (a'), which is transferred to the queue manager 6. The queue manager 6 monitors the internal queue, and if the signal (a') is present in the internal queue, activates the SDL execution unit 2 by a function call.

The activated SDL execution unit 2 fetches the signal (a') from the internal queue and carries out a process accordingly. When the process is settled, the queue manager 6 takes control. The queue manager 6 monitors the internal queue, and if there is no signal in the queue, control is handed over to the environment unit 1 that is being executed as a task of the OS 3.

When the SDL execution unit 2 has a signal (b) to be sent to the environment unit 1, the queue manager 6 fetches the signal (b), and the pseudo internal signal generator 5 converts the signal (b) into a signal (b'), which is transferred as a function return value or an output pointer to the environment unit 1 that is operating under a task of the OS 3.

In this way, the present invention operates the environment unit 1 as a task of the OS 3 and combines the SDL execution unit 2 with the environment unit 1 through the adapter 4. Even if there are many SDL execution units 2, there is no need of assigning OS tasks to the SDL execution units, respectively. Even if there are many signals to be transferred between the environment unit 1 and the SDL execution units or between the SDL execution units, communication controllers of the OS 3 are irrelevant to the signal transfer. As a result, there is no increase in the overhead of the OS 3 due to task assignment and signal transfer.

Figure 2:
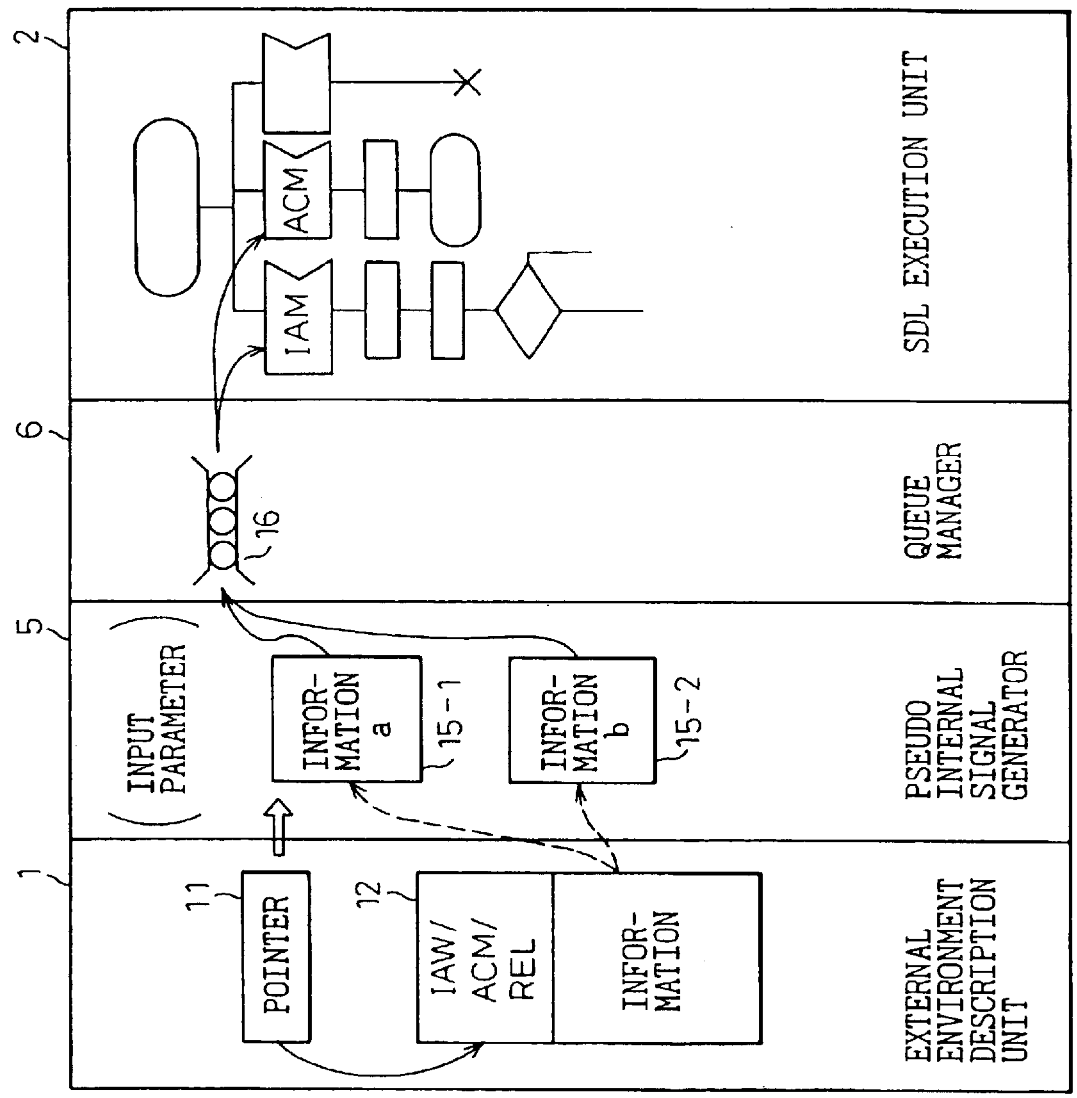
FIG. 2 explains a signal separating function of the embodiment.

FIG. 2 shows a signal separation function according to the embodiment of the present invention. The environment unit 1 has a pointer 11 that indicates, for example, an information unit 12. The information unit 12 is going to be transferred to the SDL execution unit 2 and contains several signal elements. The signal elements may include an initial addressing message IAM, an addressing completion message ACM, a release message REL, related information, etc. According to input parameters, the pseudo internal signal generator 5 separates the information unit 12 into an information unit 15-1 containing information "a" and an information unit 15-2 containing information "b." The information units 15-1 and 15-2 transfer the information pieces "a" and "b" to the internal queue 16 of the queue manager 6.

ISUP (ISDN User Part) of ITU-T Recommendations presently specifies forty-five standardized messages. For example, an initial addressing message IAM is standardized as code 01(h) ((h) representing hexadecimal notation), addressing completion message ACM as code 05(h), release message REL as code 0c(h), answer message ANM as code 09(h), connection message CON as code 07(h), and release completion message RLC as code 10(h).

In response to the information pieces "a" and "b" in the internal queue 16, the queue manager 6 activates the SDL execution unit 2, which fetches the information pieces "a" and "b" from the internal queue 16. Then, the SDL execution unit 2 becomes ready to receive the messages IAM and ACM. In this case, there is no need for the OS 3 to create tasks for each transfer of signals, and therefore, there is no increase in the overhead of the OS 3.

Figure 3:
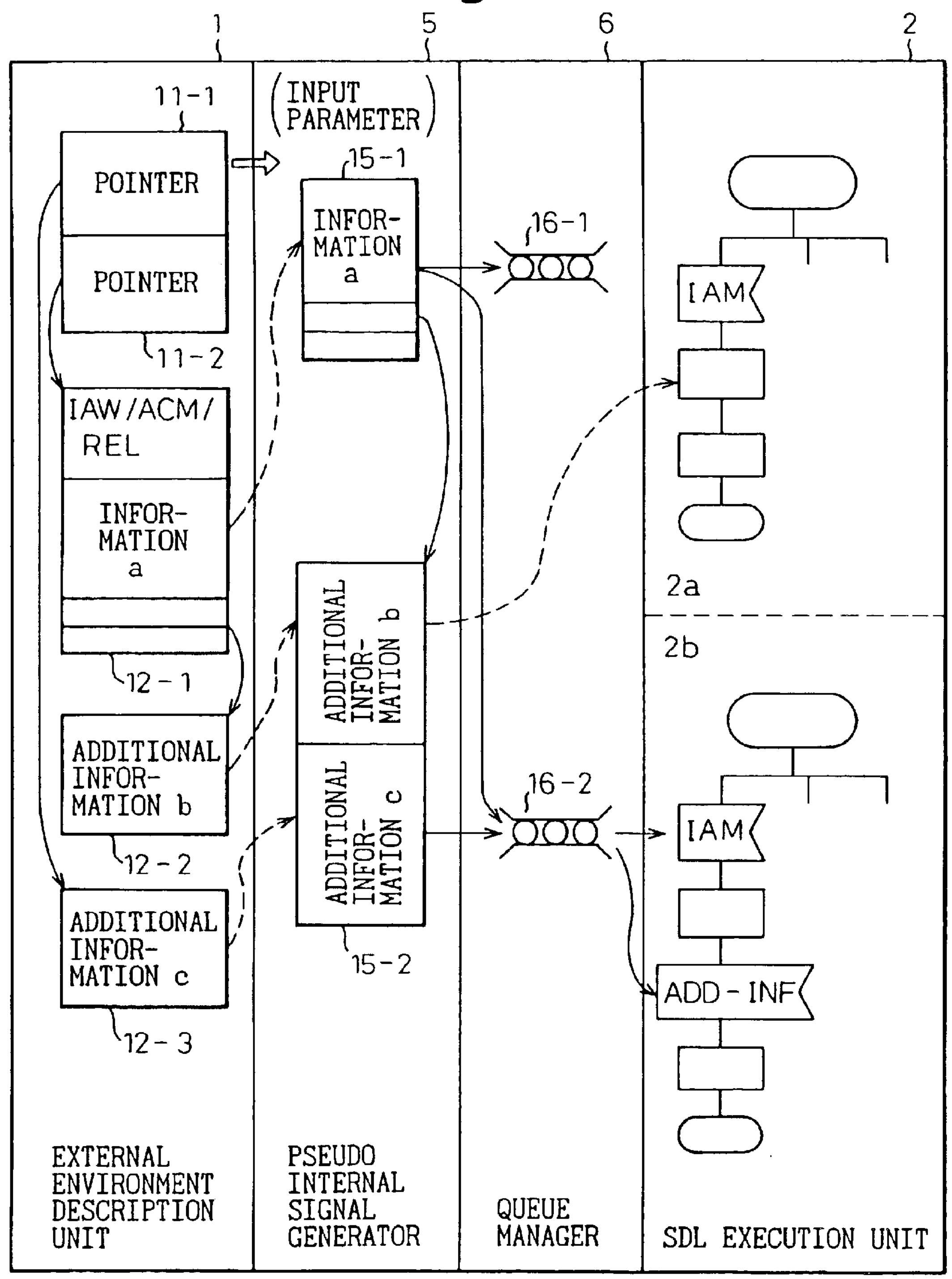
FIG. 3 explains a signal integrating function of the embodiment.

FIG. 3 shows a signal integrating function according of the embodiment of the present invention. The same reference numerals as those of FIG. 2 represent like parts. FIG. 3 additionally shows pointers 11-1 and 11-2, a main information unit 12-1, additional information units 12-2 and 12-3, information units 15-1 and 15-2, internal queues 16-1 and 16-2, and cases **2*a* and 2*b* contained in the SDL execution unit 2**.

The main information unit 12-1 in the environment unit 1 includes a message such as the initial addressing message IAM, addressing completion message ACM, or release message REL, and information "a" corresponding to the message. The additional information units 12-2 and 12-3 contain additional information "b" and "c" related to the information "a" serving as a main signal. The additional information unit 12-2 is linked to the main information unit 12-1, and the additional information unit 12-3 is indicated with the pointer 11-1.

The pointer 11-2 indicates the main information unit 12-1, and the information "a" is transferred as a main signal to the information unit 15-1 in the pseudo internal signal generator 5. The additional information unit 12-2 linked to the main information unit 12-1 transfers the additional information "b" to the information unit 15-2 in the pseudo internal signal generator 5. The information "a" serving as the main signal contains link information for the additional information "b." These operations relate to the case **2*a* of the SDL execution unit 2**.

According to input parameters, the pseudo internal signal generator 5 becomes ready to transfer the information "a" as a main signal through the internal queue 16-1 to the SDL execution unit 2 activated by the queue manager 6. The SDL execution unit 2 advances process steps from, for example, a reception of the initial addressing message IAM, refers to the link information added to the main signal to see the additional information "b" of the additional information unit 15-1, and continues to process steps.

The case **2*b* of the SDL execution unit 2 will be explained. The pointer 11-2 indicates the main information unit 12-1, and the pointer 11-1 indicates the additional information unit 12-3. The information "a" of the main information unit 12-1 is transferred to the information unit 15-1, and the additional information "c" of the additional information unit 12-3 corresponding to the information "a" is transferred to the information unit 15-2. The pseudo internal signal generator 5 transfers the information "a" as a main signal through the internal queue 16-2 to the SDL execution unit 2 activated by the queue manager 6. The additional information "c" is also transferred to the SDL execution unit 2 through the internal queue 16-2. The case 2*b* of the SDL execution unit 2**, therefore, advances process steps from a reception of the initial addressing message IAM to the next process step and to a reception of additional information ADD-INF.

Figure 4:
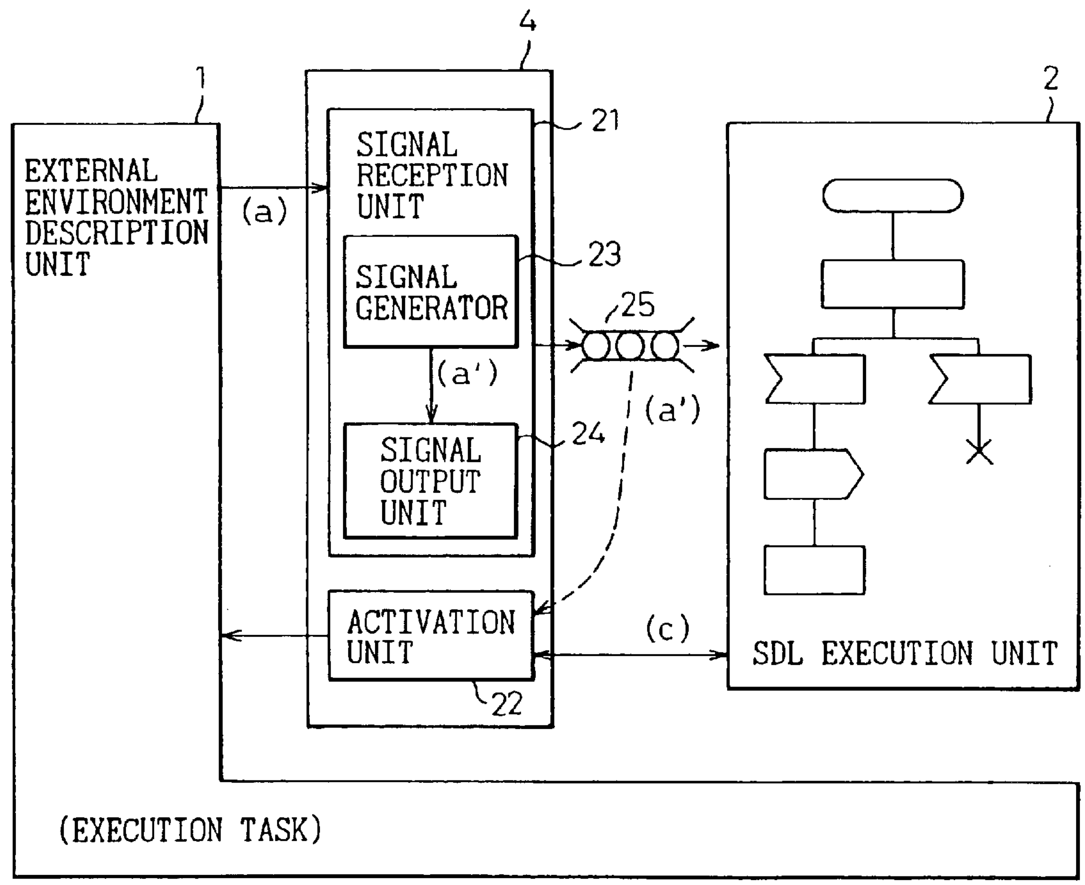
FIG. 4 explains an operation of the embodiment.
Figure 4:
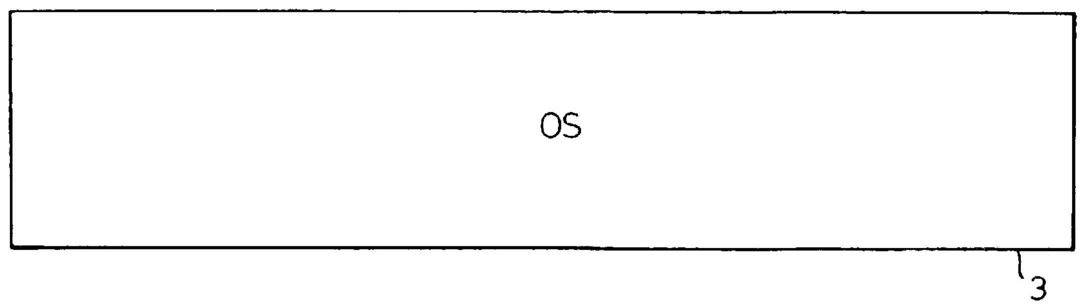

FIG. 4 shows an operation of the embodiment of the present invention. This figure shows the environment unit 1, SDL execution unit 2, OS 3, and adapter 4. The adapter 4 has a signal reception unit 21, an activation unit 22, a signal generator 23, a signal output unit 24, and a queue 25. The signal generator 23 and signal output unit 24 are included in the signal reception unit 21.

The signal generator 23 and signal output unit 24 provide the function of the pseudo internal signal generator 5 of FIG. 1. The activation unit 22 provides the function of the queue manager 6 of FIG. 1. The environment unit 1 is described in C or C++ language, and the SDL execution unit 2 is described in SDL.

The environment unit 1 is executed as a task of the OS 3. Control is handed over to the signal reception unit 21 from the environment unit 1 by function call. At this time, the execution task hands over data (a) to the SDL execution unit 2 as an argument of a function f (a). The signal generator 23 converts the received data (a) into a signal (a') that can be received by the SDL execution unit 2. The signal output unit 24 links the converted signal (a') to the queue 25.

The activation unit 22 monitors the queue 25, and if the queue 25 is holding a signal, activates the SDL execution unit 2. The SDL execution unit 2 fetches the signal (a') from the queue 25, and the SDL execution unit 2 advances process steps accordingly. When the SDL execution unit 2 reaches a step of waiting for the next signal, control is returned to the activation unit 22. These operations are repeated to process information without assigning tasks of the OS 3 to the SDL execution unit 2.

Figure 5:
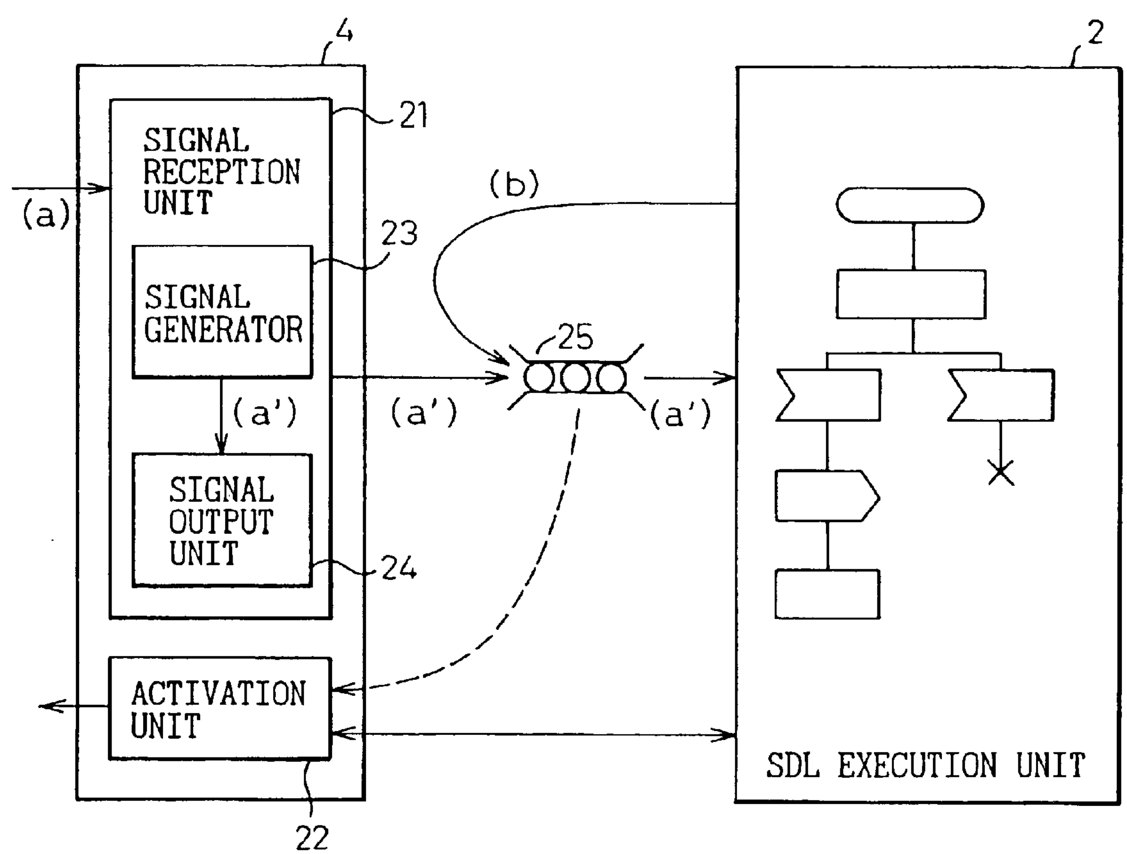
FIG. 5 explains another operation of the embodiment.

FIG. 5 shows another operation of the embodiment of the present invention. This figure shows only the SDL execution unit 2 and adapter 4 of FIG. 4. As explained above, the signal generator 23 converts a signal (a) into a signal (a') to be transferred to the SDL execution unit 2. The signal (a') is transferred from the signal output unit 24 to the queue 25. The activation unit 22 monitors the queue 25 and activates the SDL execution unit 2. The activated SDL execution unit 2 fetches the signal (a') from the queue 25. If the SDL execution unit 2 generates a signal (b), this signal is transferred to the queue 25.

Figure 6:
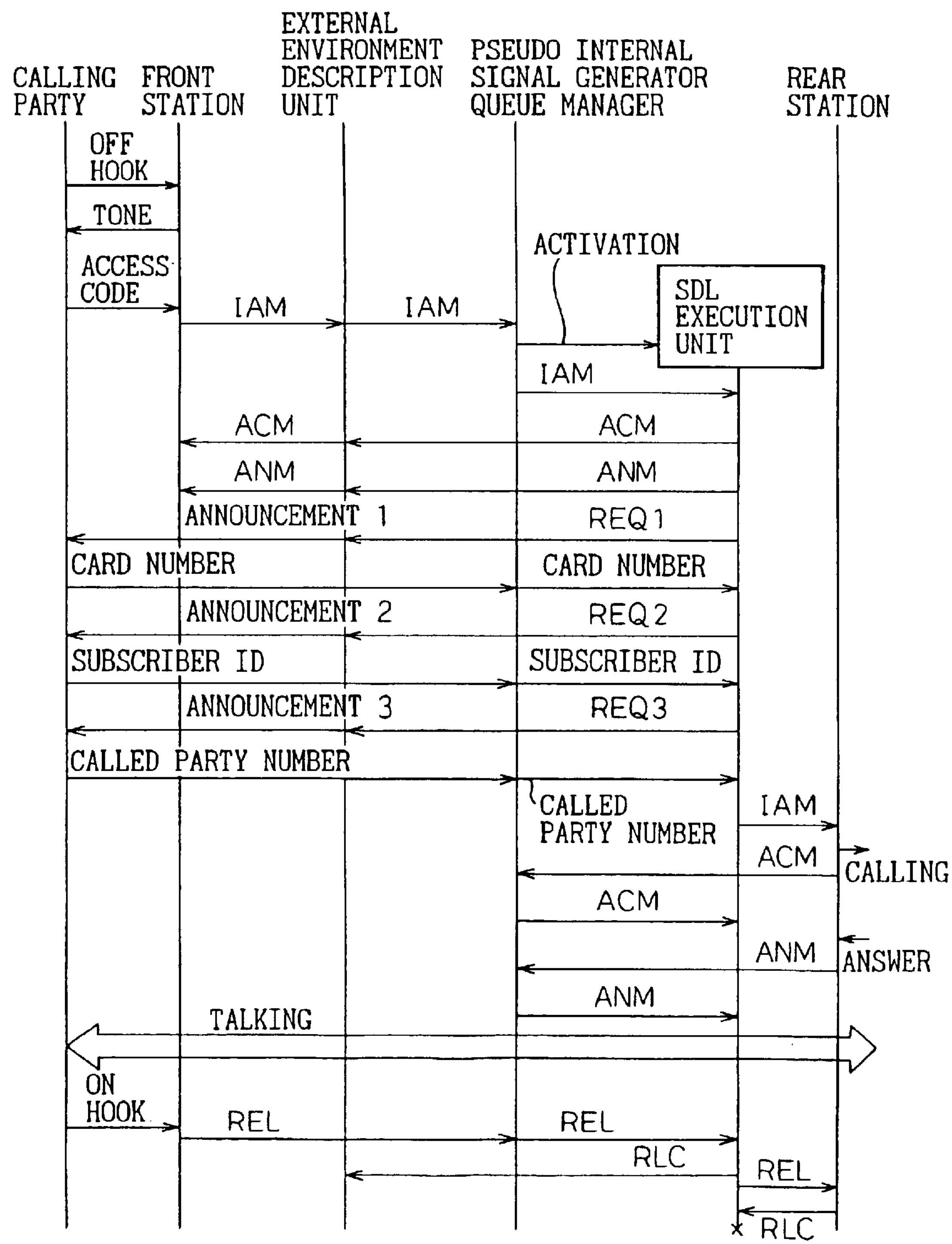
FIG. 6 shows a sequence of operations of the embodiment.

FIG. 6 shows a sequence of processes of the embodiment of the present invention. This example shows a credit-card call service. In the explanation, an exchange that handles a calling party is a "front station," and an exchange that handles a called party is a "rear station." The function that realizes the credit-card call service may be provided for the front station, the rear station, or an intermediate station between the front and rear stations. This function is described in SDL and the other functions in C++.

The functions described in C++ are in the environment unit 1 of FIGS. 1 to 4, and the function described in SDL is in the SDL execution unit 2 of FIGS. 1 to 5. Between the environment unit 1 and the SDL execution unit 2, there is arranged the adapter 4 of FIGS. 1 to 5 consisting of the pseudo internal signal generator 5 and queue manager 6. Thick arrows of FIG. 6 indicate signals transferred from the adapter 4 to the SDL execution unit 2.

When the calling party lifts the phone, the front station detects the same and returns a dial tone. The calling party recognizes the dial tone and dials a service access code to make a credit-card call service request. The front station recognizes the code, forms an initial addressing message IAM corresponding to the code, and sends the message IAM. The message IAM contains information such as a calling party number necessary for setting a call.

The environment unit 1 receives the message IAM, separates or integrates a main signal and additional information as explained with reference to FIGS. 2 and 3, and transfers the information to the pseudo internal signal generator 5, which transfers it to the SDL execution unit 2.

The pseudo internal signal generator 5 generates in, for example, the signal generator 23 (FIG. 4) an initial addressing message IAM for the SDL execution unit 2 according to the received message IAM and puts the generated message in the queue 25. The activation unit 22 monitors the queue 25 and activates the SDL execution unit 2. The activated SDL execution unit 2 fetches the message IAM from the queue 25.

In response to the message IAM, the SDL execution unit 2 returns an addressing completion message ACM and an answer message ANM to the environment unit 1. The environment unit 1 transfers the messages ACM and ANM to the front station. The process steps in the credit-card call service advance, and the SDL execution unit 2 sends an announcement request REQ1 to the environment unit 1.

In response to the request REQ1, the environment unit 1 sends an announcement of, for example, "Please input the card number" to the calling party through the front station.

In response to the announcement, the calling party inputs the number of the credit card. The front station transfers the card number to the pseudo internal signal generator 5, which transfers the card number to the SDL execution unit 2 through the queue manager 6. In response to the card number, the SDL execution unit 2 returns an announcement request REQ2 to the environment unit 1.

In response to the request REQ2, the environment unit 1 sends an announcement of, for example, "Please input the personal number" to the calling party through the front station.

In response to the announcement, the calling party inputs a personal number (subscriber ID). The front station transfers the personal number to the pseudo internal signal generator 5, which transfers it to the SDL execution unit 2 through the queue manager 6. In response to the personal number, the SDL execution unit 2 returns an announcement request REQ3 to the environment unit 1.

In response to the request REQ3, the environment unit 1 sends an announcement of, for example, "Please input a called subscriber number" to the calling party through the front station.

In response to the announcement, the calling party inputs the telephone number of the called subscriber. The front station transfers the telephone number to the pseudo internal signal generator 5, which transfers it to the SDL execution unit 2 through the queue manager 6.

According to the telephone number, the SDL execution unit 2 sends an initial addressing message IAM to the rear station. In response to the message IAM, the rear station calls the called subscriber and returns an addressing completion message ACM to the pseudo internal signal generator 5. In response to the message ACM, the pseudo internal signal generator 5 transfers an addressing completion message ACM to the SDL execution unit 2. If the called subscriber answers, the rear station sends an answer message ANM to the pseudo internal signal generator 5, which transfers it to the SDL execution unit 2. As a result, a speech channel is established by the called subscriber, and the channel is set in a busy state.

Once the speech is completed, the calling party hangs up the phone. The front station transfers a release message REL for releasing the channel to the pseudo internal signal generator 5, which transfers it to the SDL execution unit 2. In response to this, the SDL execution unit 2 sends a release completion message RLC indicating that the channel has been completely released, to the environment unit 1, and at the same time, a release message REL to the rear station. In response to the message REL, the rear station sends a release completion message RLC to the SDL execution unit 2. When this message RLC is received by the SDL execution unit 2, the series of processes ends.

In this way, signals are transferred between the environment unit 1 and the SDL execution unit 2 through the adapter 4. Accordingly, the OS 3 only assigns a task to the environment unit 1. This greatly reduces the overhead of the OS 3.

Figure 7:
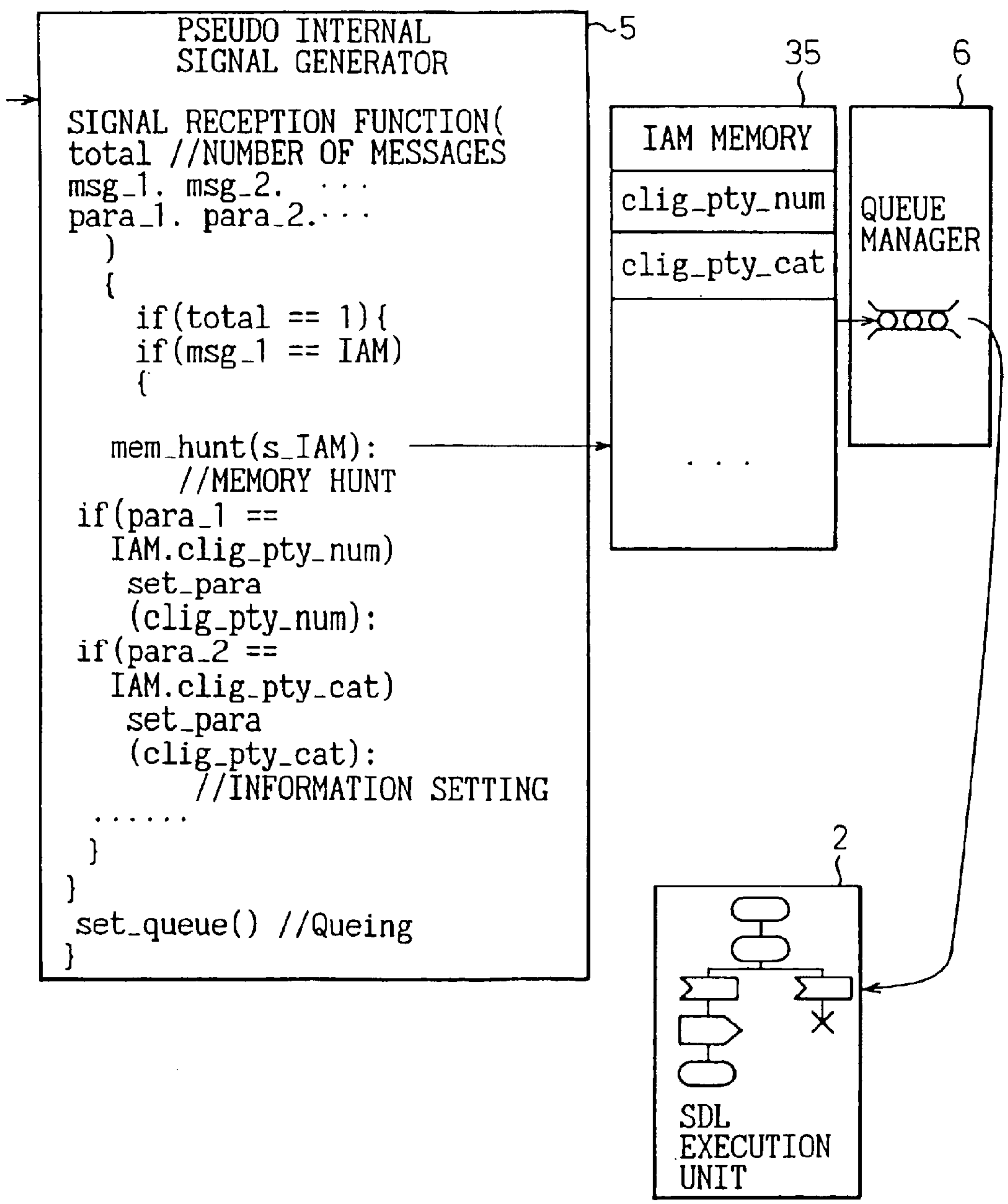
FIG. 7 explains a normal operation of the embodiment.

FIG. 7 shows the pseudo internal signal generator 5, an IAM memory 35, the queue manager 6, and the SDL execution unit 2, to explain a normal operation of the embodiment of the present invention. The pseudo internal signal generator 5 receives, for example, an initial addressing message IAM from the environment unit 1 and searches the IAM memory 35 according to messages msg_1, msg_2, and the like and parameters para_1, para_2, and the like related to the-message IAM.

The IAM memory 35 holds a calling party number clig_pty_num, calling party category clig_pty_cat, etc. In the case of the parameter para_1 of the message msg_1, the calling party number clig_pty_num is set and transferred to the queue manager 6. The SDL execution unit 2 fetches the information from the queue manager 6 and carries out processes according to the information.

Figure 8:
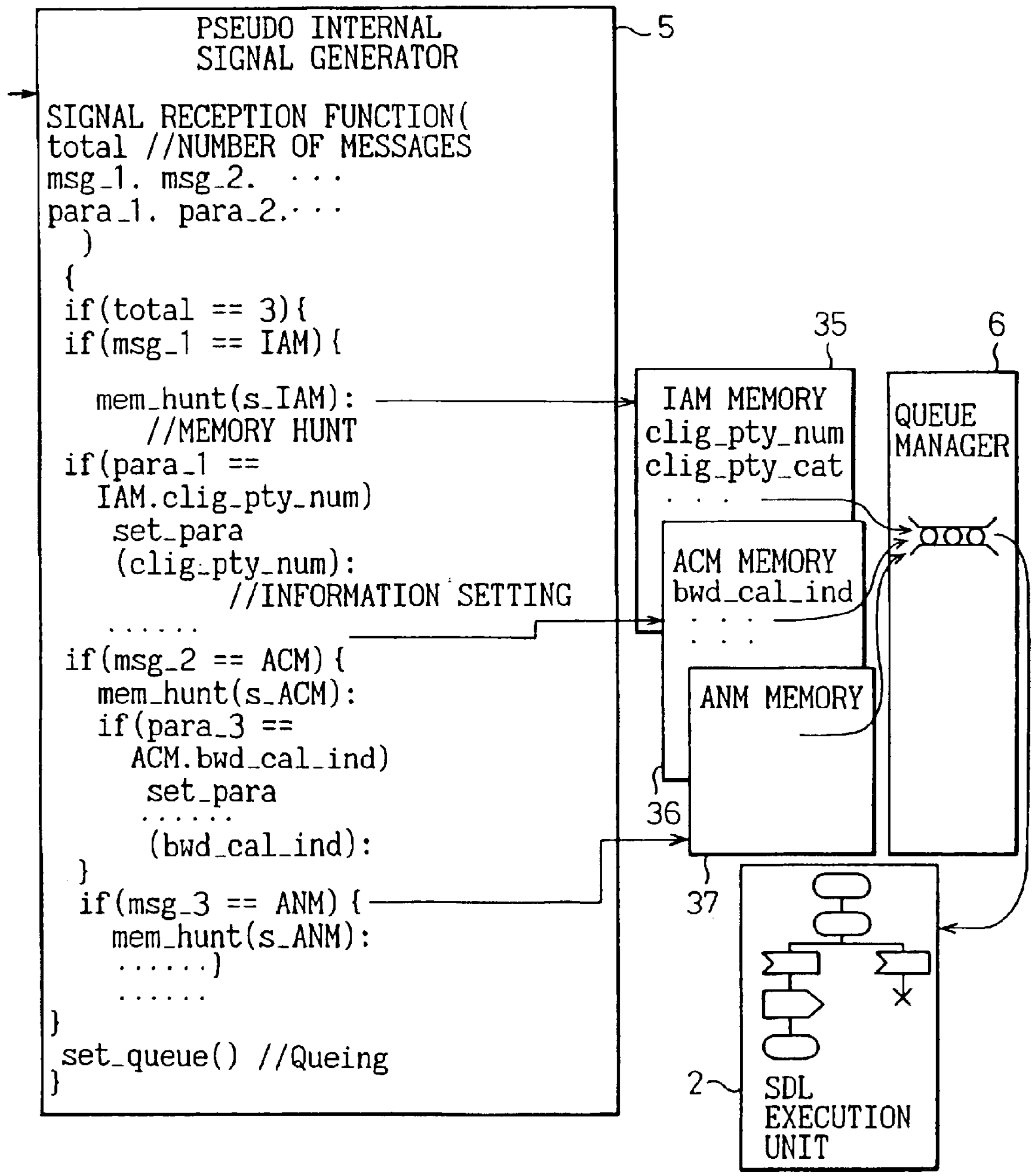
FIG. 8 explains a separating operation of the embodiment.

FIG. 8 explains a separation operation of the embodiment of the present invention. The same reference marks as those of FIG. 7 represent like parts. FIG. 8 additionally shows an ACM memory 36 and an ANM memory 37 to achieve the signal separation function of FIG. 2. If the pseudo internal signal generator 5 receives from the environment unit 1 three messages msg_1==IAM, msg_2==ACM, and msg_3==ANM, it sequentially searches the IAM memory 35, ACM memory 36, and ANM memory 37 according to a memory search parameter mem_hunt.

According to parameters para_1, para_2, and para_3, the pseudo internal signal generator 5 sets information and transfers the information to the queue manager 6. For example, if msg_2==ACM and para_3==ACM.bwd_cal_ind, the pseudo internal signal generator 5 sets data bwd_cal_ind (backward call indication) by searching the ACM memory 36 and transfers the data to the queue manager 6. Then, the SDL execution unit 2 sequentially fetches data from the queue manager 6 and carries out processes accordingly.

Figure 9:
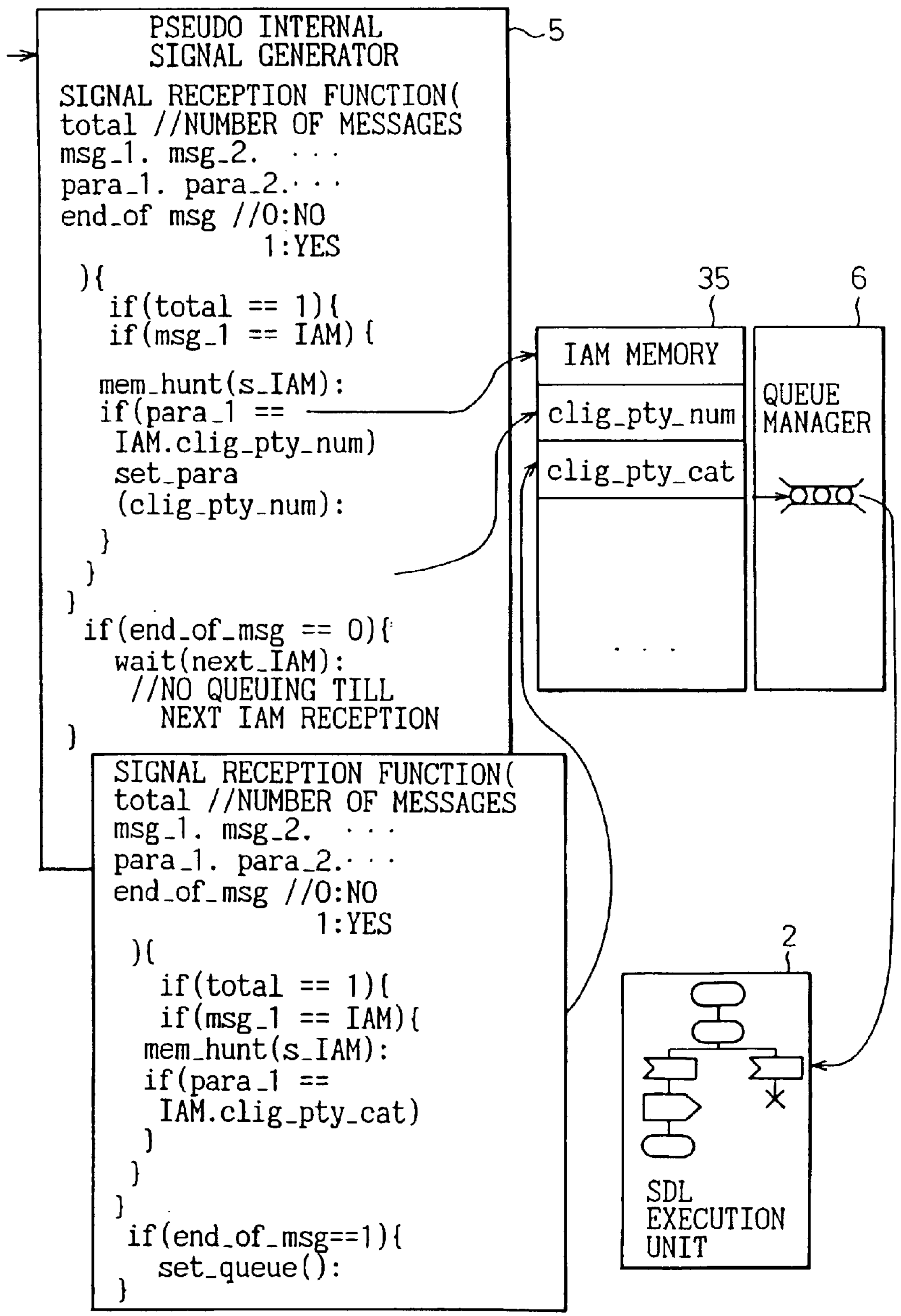
FIG. 9 explains an integrating operation of the embodiment.

FIG. 9 shows an integration operation of the embodiment of the present invention and corresponds to the signal integration function of FIG. 3. If end_of_msg ==0, the pseudo internal signal generator 5 waits for the next initial addressing message IAM, and if end_of_msg ==1, the pseudo internal signal generator 5 sends data to the queue. Namely, the calling party number clig_pty_num and calling party category clig_pty_cat are integrated, set, and transferred to the queue manager 6.

The normal operation of FIG. 7 involving a single message, the separation operation of FIG. 8 for separating a plurality of messages from one another, and the integration operation of FIG. 9 of integrating a plurality of messages into one may be combined in various ways to carry out the telephone service of FIG. 6 with the use of the pseudo internal signal generator 5 and queue manager 6.

As explained above, the present invention combines the execution unit 2 described in SDL with the external environment unit 1 described in a programming language such as C and C++ other than SDL through the adapter consisting of the pseudo internal signal generator 5 and queue manager 6. Then, the present invention transfers signals including messages, events, and parameters between the environment unit 1 and the SDL execution unit 2 through the adapter without using communication controllers of the OS 3.

As a result, the OS 3 is not required to assign tasks to the SDL execution unit 2. This reduces the overhead of the OS 3. Since no communication controller of the OS is needed, no increase will be made in the overhead of the OS even if the number of signals transferred between the environment unit 1 and the SDL execution unit 2 increases. The environment unit 1 and SDL execution unit 2 may be prepared independently of each other without considering each other.

What is claimed is:

1. An information processing method for use with an SDL execution unit described in a specification and description language (SDL), an external environment description unit described in a programming language other than the SDL, an adapter having a pseudo internal signal generator and a queue manager, and an operating system, the method comprising the steps of:

connecting the SDL execution unit and the external environment description unit to each other through the adapter so that signals containing at least one of messages, events and parameters may be exchanged between the SDL execution unit and the external environment description unit through the adapter;

executing the external environment description unit as a single task of the operating system; and executing the single task so that the pseudo internal signal generator running on said external environment description unit converts and transfers the signals between the SDL execution unit and the external environment description unit; wherein executing the single task includes the steps of receiving information to be transferred to the SDL execution unit from the external environment description unit, the information being received as function parameters for the pseudo internal signal generator; converting the information by the pseudo internal signal generator into signals to be transferred to the SDL execution unit; transferring the converted signals to the queue manager; monitoring an internal queue of the queue manager; and activating, if the internal queue is holding the converted signals, the SDL execution unit by a function call so that the activated SDL execution unit may fetch the converted signals from the internal queue and carry out processes accordingly.

2. An information processing apparatus for processing information under the control of a task assigned by an operation system, comprising:

an SDL execution unit described in a specification and description language (SDL);

an external environment description unit described in a programming language other than SDL, said external environment unit being executed as a single task of the operating system; and an adapter, running on said external environment description unit, for connecting the SDL execution unit described in SDL and the external environment description unit to each other so that signals are converted and transferred between the SDL execution unit and the external environment description unit through the adapter, the adapter having:

a pseudo internal signal generator for separating, integrating, and converting signals to be transferred between the SDL execution unit and the external environment description unit; and a queue manager having an internal queue for holding the signals to be transferred between the SDL execution unit and the external environment description unit;

whereby no separate task is assigned by the operating system to the SDL execution unit and overhead of the operating system is thereby reduced.

* * * * *